(12) United States Patent
Dolinskiy et al.

(10) Patent No.: US 9,346,039 B2
(45) Date of Patent: May 24, 2016

(54) METHOD FOR PREPARING REFRACTORY ALLOY-BASED POLYMETALLIC OXIDE CATALYSTS FOR THE PARTIAL OXIDATION OF HYDROCARBONS INTO SYNTHESIS GAS

(71) Applicant: OBSHCHESTVO S OGRANICHENNOY OTVETSTVENNOST'YU "GAZOKHIM TEKHNO", Skolkovo (RU)

(72) Inventors: Sergey Erikovich Dolinskiy, Moscow (RU); Nikolay Yakovlevich Usachev, Moscow (RU); Andrey Mikhaylovich Pleshakov, Moscow (RU)

(73) Assignee: OBSHCHESTVO S OGRANICHENNOY OTVETSTVENNOST'YU, "GAZOKHIM TEKHNO", Moskovskaya OBL. (RU)

( * ) Notice: Subject to any disclaimer, the term of this patent is extended or adjusted under 35 U.S.C. 154(b) by 0 days.

(21) Appl. No.: 14/769,021

(22) PCT Filed: Dec. 2, 2013

(86) PCT No.: PCT/RU2013/001081
§ 371 (c)(1),
(2) Date: Aug. 19, 2015

(87) PCT Pub. No.: WO2015/076696
PCT Pub. Date: May 28, 2015

(65) Prior Publication Data
US 2016/0001271 A1    Jan. 7, 2016

(30) Foreign Application Priority Data

Nov. 19, 2013  (RU) ................ 2013151143

(51) Int. Cl.
| | |
|---|---|
| B01J 23/10 | (2006.01) |
| B01J 23/89 | (2006.01) |
| B01J 37/08 | (2006.01) |
| B01J 21/04 | (2006.01) |
| B01J 21/06 | (2006.01) |
| B01J 23/83 | (2006.01) |
| B01J 23/882 | (2006.01) |
| B01J 23/883 | (2006.01) |
| B01J 37/00 | (2006.01) |
| B82B 3/00 | (2006.01) |
| C01B 3/40 | (2006.01) |
| B01J 23/86 | (2006.01) |
| B01J 37/02 | (2006.01) |

(52) U.S. Cl.
CPC .............. *B01J 23/8993* (2013.01); *B01J 21/04* (2013.01); *B01J 21/06* (2013.01); *B01J 23/83* (2013.01); *B01J 23/866* (2013.01); *B01J 23/882* (2013.01); *B01J 23/883* (2013.01); *B01J 23/89* (2013.01); *B01J 37/00* (2013.01); *B01J 37/0217* (2013.01); *B01J 37/0225* (2013.01); *B01J 37/08* (2013.01); *B82B 3/00* (2013.01); *C01B 3/40* (2013.01); *C01B 2203/0233* (2013.01); *C01B 2203/0244* (2013.01); *C01B 2203/0261* (2013.01); *C01B 2203/107* (2013.01); *C01B 2203/1064* (2013.01); *C01B 2203/1094* (2013.01)

(58) Field of Classification Search
USPC ................ 502/258, 259, 263, 304, 327, 328, 502/332–335, 339, 349, 355, 415, 439
See application file for complete search history.

(56) References Cited

U.S. PATENT DOCUMENTS

| | | | | |
|---|---|---|---|---|
| 5,130,114 A | * | 7/1992 | Igarashi | B01J 21/066 423/652 |
| 6,103,660 A | | 8/2000 | Yperen et al. | 502/327 |
| 6,288,295 B1 | * | 9/2001 | Didillon | B01J 23/40 502/325 |

(Continued)

FOREIGN PATENT DOCUMENTS

| | | |
|---|---|---|
| EP | 1759764 | 3/2007 |
| RU | 2087187 | 8/1997 |
| RU | 2204434 | 5/2003 |
| RU | 2244589 | 1/2005 |
| RU | 2248932 | 3/2005 |
| RU | 2268087 | 1/2006 |
| RU | 2292237 | 1/2007 |
| RU | 2320408 | 3/2008 |
| RU | 2356628 | 5/2009 |
| RU | 2414300 | 3/2011 |

OTHER PUBLICATIONS

International Search Report, PCT/RU2013/001081, Jul. 17, 2014.

*Primary Examiner* — Colleen Dunn
*Assistant Examiner* — Haytham Soliman
(74) *Attorney, Agent, or Firm* — Matthew A. Pequignot; Pequignot + Myers LLC

(57) ABSTRACT

The invention relates to a method for preparation of oxide-polymetallic catalysts containing platinum-group metals for steam-oxidative conversion to obtain carbon monoxide and hydrogen. The method comprises treatment of NiO and $CO_3O_4$ by solutions of Al, Ce, Zr nitrates and palladium ($Pd(NH_3)_4Cl_2$), platinum ($H_2[PtCl_6] \cdot 6H_2O$) and rhodium ($H_3[RhCl_6]$) compounds followed by drying, carbonization of the obtained material in a methane flow at 550° C., preparation of slurry from this material, pseudo-boehmite and tetraisopropoxysilane, filling foam nichrome pores with obtained material suspension, elimination of water at 80° C., calcinating during 3 hours in an atmosphere of argon at 1300° C., elimination of carbon by water vapors at 600° C. during 3 hours. The technical result is development of a highly efficient heterogeneous catalyst. 3 material claims, 7 tables, 4 examples.

4 Claims, 1 Drawing Sheet

(56) References Cited

U.S. PATENT DOCUMENTS

| | | | | | |
|---|---|---|---|---|---|
| 6,342,468 | B1* | 1/2002 | Geib | ............ | C09K 8/685 |
| | | | | | 507/238 |
| 6,413,904 | B1* | 7/2002 | Strehlau | ............ | B01D 53/9422 |
| | | | | | 502/327 |
| 6,602,820 | B1* | 8/2003 | Gobel | ............ | B01D 53/9422 |
| | | | | | 423/213.2 |
| 6,878,667 | B2* | 4/2005 | Gaffney | ............ | B01J 23/8946 |
| | | | | | 502/241 |
| 7,541,310 | B2* | 6/2009 | Espinoza | ............ | B01J 21/12 |
| | | | | | 502/260 |
| 8,318,633 | B2* | 11/2012 | Fujie | ............ | B01J 23/63 |
| | | | | | 502/302 |
| 8,475,755 | B2* | 7/2013 | Dang | ............ | B01D 53/864 |
| | | | | | 423/240 S |
| 8,530,372 | B2* | 9/2013 | Luo | ............ | B01D 53/945 |
| | | | | | 502/303 |
| 8,545,780 | B1* | 10/2013 | Chen | ............ | B01D 53/945 |
| | | | | | 423/213.2 |
| 8,722,001 | B2* | 5/2014 | Ono | ............ | B01D 53/945 |
| | | | | | 423/213.5 |
| 8,835,346 | B2* | 9/2014 | Gramiccioni | ............ | B01J 37/0242 |
| | | | | | 423/213.2 |
| 9,034,269 | B2* | 5/2015 | Hilgendorff | ............ | B01J 37/0244 |
| | | | | | 422/170 |
| 2012/0258857 | A1* | 10/2012 | Pham | ............ | B01J 8/0411 |
| | | | | | 502/328 |

* cited by examiner

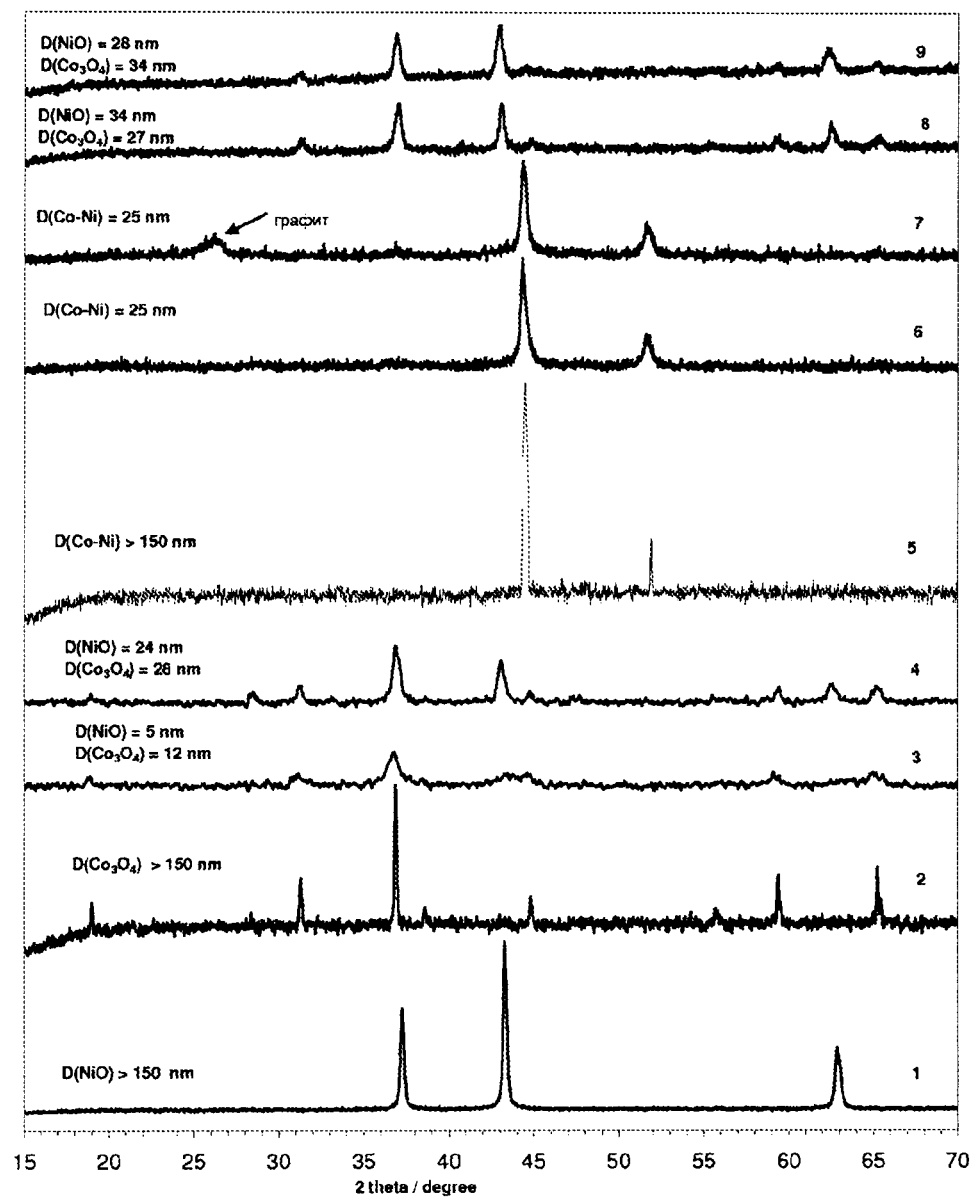

METHOD FOR PREPARING REFRACTORY ALLOY-BASED POLYMETALLIC OXIDE CATALYSTS FOR THE PARTIAL OXIDATION OF HYDROCARBONS INTO SYNTHESIS GAS

RELATED APPLICATION DATA

This application is the national stage entry of International Appl. No. PCT/RU2013/001081, filed Dec. 2, 2013, which claims priority to Russian Patent Application No. 2013151143, filed Nov. 19, 2013. All claims of priority to that application are hereby made, and that application is hereby incorporated in its entirety by reference.

FIELD OF THE INVENTION

This invention relates to a process of preparation of a heterogeneous catalyst for partial oxidation of hydrocarbon feedstock into synthesis gas by atmospheric oxygen or water vapors. In the case of methane and ethane oxidation by oxygen the chemical equations are as follows:

$$CH_4 + 0.5O_2 = CO + 2H_2 \ (H_2/CO=2)$$

$$C_2H_6 + O_2 = 2CO + 3H_2 \ (H_2/CO=1.5)$$

To achieve an optimal for Fischer-Tropsch process or methanol synthesis $H_2/CO$ ratio equaling 2 it is necessary to inject water vapors in a reaction mixture to increase this ratio:

$$C_2H_6 + 2H_2O \rightarrow 2CO + 5H_2 \ (H_2/CO=2.5).$$

This is to an even greater extent relates to hydrocarbon feedstock that contains compounds with lower H/C ratio.

BACKGROUND OF THE INVENTION

Development of a high-performance catalyst capable to accelerate steam-oxidative conversion of hydrocarbon mixtures (Table 1) without their preliminary separation is not only an important scientific task but also is of large economic significance. Urgency of this issue is determined by the fact that only in the Russian Federation due to the lack of necessary infrastructure there are tremendous amounts (more than 50 billion m³/year) of associated petroleum gas (APG) flared on oil production sites incurring serious economic losses and posing an environmental threat. Availability of efficient catalytic systems will allow to develop compact mobile plants which capacity will be commensurate to flow rate of oil wells in operation that will pave the way to practical APG utilization in remote regions.

Difficulties of APG processing into synthesis gas are to a wide extent determined by the fact that it contains hydrocarbons with significantly different reactivity. For example, in n-alkane $C_1$-$C_7$ series the values of their formation constants decrease by many orders (Table 2) providing evidence of their stability reduction and carbon formation probability.

TABLE 2

Values lgK*) of lower n-alkane formation at 1000° K

| Methane | Ethane | Propane | Butane | Pentane | Hexane | Heptane |
|---------|--------|---------|--------|---------|--------|---------|
| −1.0 | −5.71 | −9.98 | −14.10 | −18.40 | −22.64 | −26.89 |

*) $K = [C_nH_{(2n+2)}]/[H_2]^{(n+1)}$

This leads to intensive carbon deposit on catalyst surface and its fast deactivation.

Complexity of this problem solution is determined by the fact that catalysts for hydrocarbon conversion into synthesis gas and their cracking contain the same active components—group VIII metals. The most common approaches to reduction of carbon formation comprise optimization of process conditions (selection of a temperature regime, pressure, time of contact, combination of different oxidizers). Important results were obtained in the course of the development of new catalytic systems.

To increase the rate of carbon elimination from catalyst surfaces there are components introduced into their composition that are highly active in oxidation reactions. Cerium oxide allows to achieve the maximum effect that especially strongly shows itself in mixed oxides, for example, in Ce—Zr—O. Dispersiveness of an active metal in a catalyst is one of the factors that have an effect on carbon deposition because this process appears to be a structure-sensitive one. Carbon accumulation occurs with the participation of large enough metal particles, which size corresponds to a diameter of forming carbon nanotubes. The use of carriers capable of strong interaction with an active phase allows to prevent metal cluster agglomeration. The carbon formation rate depends on the active metal nature. The presence of platinum-group metals in a catalyst significantly decelerate this process.

Authors [Hotz N.; et al, AIChE Journal, 55(7), 1849-1859, 2009] suggested a sol-gel method for porous ceramic catalyst preparation by in-situ application of nanosized particles of

TABLE 1

Average Composition (% wt.) of APG from Different Oil Fields [Solovyanov A. A., Andreeva N. N., Kryukov V. A., Lyats K. G. Associated Petroleum Gas Utilization Strategy in Russian Federation, Moscow: ZAO "Newspaper "Quarum" Editorial Office", 2008, 320 pp.].

| Field | $CO_2$ | $N_2$ | Methane | Ethane | Propane | i-Butane | n-Butane | i-Pentane | n-Pentane |
|-------|--------|-------|---------|--------|---------|----------|----------|-----------|-----------|
| Danilovskoye | 1.07 | 2.13 | 84.18 | 2.38 | 4.28 | 3.55 | | $C_5$-1.44, $C_{6-10}$-1.59 | |
| Barsukovskoye | 0.96 | 1.80 | 80.78 | 5.81 | 4.27 | 2.04 | 2.00 | 1.16 | 0.65 |
| Samotlorskoye | 0.59 | 1.48 | 60.64 | 4.13 | 13.05 | 4.04 | 8.6 | 2.52 | 2.65 |
| Varyeganskoye | 0.69 | 1.51 | 59.33 | 8.31 | 13.51 | 4.05 | 6.65 | 2.2 | 1.8 |
| Tarasovskoye | 0.48 | 1.47 | 54.16 | 12.5 | 16.44 | 4.2 | 6.39 | 1.98 | 1.58 |
| Sovetskoye | 1.02 | 1.53 | 51.89 | 5.29 | 15.57 | 5.02 | 10.33 | 2.99 | 3.26 |
| Uzenskoye | — | 2.30 | 50.20 | 20.2 | 16.80 | — | 7.7 | — | 3.0 |
| Aganskoye | 0.5 | 1.53 | 46.94 | 6.89 | 17.37 | 4.47 | 10.84 | 3.36 | 3.88 |
| Romashkinskoye | 1.5 | 8.0 | 38.80 | 19.1 | 17.80 | — | 8.0 | — | 6.8 |
| Bavlinskoye | 0.4 | 8.4 | 35.00 | 20.7 | 19.90 | — | 9.8 | — | 5.8 |

Rh/Ce—Zr—O. This system displayed high thermal and catalytic stability in butane oxidative conversion into synthesis gas. The positive effect of cerium oxide as well appears in the case of $Pt/CeO_2/Al_2O_3$ and $Pt/CeZrO_2/Al_2O_3$ systems when $CeO_2$ was introduced into a carrier [F. A. Silva et al, Appl. Catal. A: General 335 (2008) 145-152].

Besides the questions connected with catalyst chemical composition, the state and form of a catalyst is another very important problem. Variation of these parameters paves the way to the result-oriented adjustment of mass- and heat-transfer that is necessary for optimization of synthesis gas production technology. In this respect, porous monolythic catalysts on the base of heat-resistant materials (ceramics, metal alloys and their combinations) possessing low aerodynamic resistance appears to be very promising.

Utilization of metal carriers like foamed materials, lattices, perforated or corrugated foil (RU2204434, RU2248932, RU2268087, RU2292237, RU2320408) prevent catalyst local overheating due to their high thermal conductivity that prolongs the service life of a catalyst.

The process of preparation of catalysts deposited on metals with large surface area usually includes carrier preliminary oxidative treatment that significantly increases their adhesive properties maintaining stability of such systems. An additional operation for composite material efficiency improvement is the application on a metal (alloy) calcinated in an oxidative atmosphere of a primer agent, for example, pseudo-boehmite, with active components introduced in its layer.

For instance, in one of the works (Bobrova L., Vernikovskaya N., Sadykov V.//Catal. Today. 2009. V. 144. P. 185) there was suggested a catalyst $LaCeZrO_x$ (5.3 wt. %)//LaNiPt (2 wt. %) on a fechral lattice, made from wire with the diameter of 2 mm. A method of its preparation included sputtering of a corundum layer on a lattice followed by deposition of $\gamma$-$Al_2O_3$ (3.6 wt. %) from a corresponding suspension. An active phase was formed by coating with $LaCeZrO_x$ suspension and impregnation with solutions of La, Ni and Pt compounds.

The homogeneity of catalyst active particles distribution on a carrier is achieved with the help of different methods. For example, in a catalyst preparation method according to U.S. Pat. No. 6,103,660, published Aug. 15, 2000, the slow homogeneous deposition of active component precursor particles on carrier particles is achieved: an active component precursor solution is introduced into a carrier particle suspension by capillary injection while continuously stirring. $\gamma$-$Al_2O_3$ or mixture of stabilized by lanthanum $\gamma$-$Al_2O_3$ with mixed Ce/Zr oxides with Ce, Zr, Ba acetates deposited on them is used as a carrier.

According to patent EP1759764, published Mar. 7, 2007, a hydrocarbon decomposition catalyst contains active metal particles (noble metals as well as Cr, Mn, Ti, Cu, Co, V and others, 0.025-10% wt. of a catalyst) of size 0.5-50 nm deposited on particles of a calcinated carrier of size 0.05-0.4 µm by any conventional method (precipitation, impregnation, equilibrium adsorption etc.). The main components of a carrier are Mg, Al, Ni (0.1-40% wt. of a catalyst), Si (0.001-20% wt. of a catalyst) in the form of mixed oxides. A carrier is obtained by thermal decomposition of a hydroxide mixture that are formed in alkaline environment from water-soluble salts and oxides (Si—from sodium silicate). The size of nickel particles in a catalyst may be of 1-20 nm.

In patent application US20120258857, published Oct. 11, 2012, there is described a method for obtaining a catalyst for autothermal reforming that appears to consist of magnesium, nickel and aluminium mixed oxides of size 40-300 nm that includes sol-gel synthesis of Mg, Ni and Al layered hydroxide precursor from salts of corresponding metals, its drying, at least partial decomposition at a temperature of 500-600° C. and reduction in $H_2$—$N_2$ environment at a temperature of 450-700° C. with obtaining nanosized particles. This catalyst is distinguished by low carbon formation rate and high activity.

From patent RU 2320408, published Mar. 27, 2008, and patent RU 2356628, published May 27, 2009, there is known a method for preparation of a catalyst that appears to be a heat-resistant armored carrier on which with the help of impregnation followed by heat treatment are deposited barium, manganese and cobalt mixed oxides. Mixed oxides consist of coarse-grain agglomerates of a few micrometer size and primary particles of 100-200 nm. A carrier—is a netted material of X23IO5T grade (fechral). The optimum conditions for the catalyst operation are: the $O_2$/carbon ratio=0.5-0.6, $H_2O$/carbon ratio=1.5-1.7, residence time 0.3-0.4 sec., temperature 800-950° C. The reaction products contain, % vol.: hydrogen—32, methane—1, carbon dioxide—12, carbon monoxide—11, nitrogen—44. Changing of the water/carbon ratio within the range of 1.2-2.2 yields synthesis gas with the $H_2$/CO ratio=2.3-3.65. This catalyst is resistant to carbon formation, at least during 100 hours of testing.

The closest to the claimed by us catalyst is a catalyst from U.S. Pat. No. 5,130,114, published Jul. 14, 1992 (prototype), for hydrocarbon steam reforming that incorporates a carrier—zirconium oxide, main active component—Rh and/or Ru and cocatalyst—at least one element from the group of Ni, Cr, Mg, Ca, Y and other rare earth elements. Catalyst high activity and low carbon formation rate is connected with the properties of a zirconium oxide as a carrier that can be used in a mixture with other carriers—$SiO_2$, $Al_2O_3$, zeolite. A porous carrier may be deposited on a metal bed.

SUMMARY OF THE INVENTION

The technical task being solved by the invention is development of a high effective, easy-to-prepare universal heterogeneous catalyst of hydrocarbon partial oxidation by air or air-steam mixture under small residence times (less than 1 second).

This task is solved by usage of a heterogeneous catalyst that appears to be a complex composite of a porous mixture of heat resistant aluminium, zirconium and cerium oxides with dispersed active components in them (nanosized nickel and cobalt clusters and their compounds) promoted and secured from carbonization by platinum metals. The components in the form of catalyst mass are deposited on foam nichrome.

BRIEF DESCRIPTION OF THE DRAWINGS

FIG. 1 is an X-ray phase analysis spectra of promoted NiCo-system and its active components.

Preparation of catalysts comprises the following stages:

1. Treatment of a mechanical mixture of nickel and cobalt oxides by a solution containing corresponding amounts of Al, Ce and zirconyl nitrates as well as palladium ($Pd(NH_3)_4Cl_2$), platinum ($H_2[PtCl_6] \cdot 6H_2O$) and rhodium ($H_3[RhCl_6]$) compounds. Total component concentration in a solution was of 5-20%. The suspension obtained was dried and heated till 500° C. at the rate of 100° C./hour in air.

2. Carbonization of the obtained powder-like material (5 g) was carried out in a methane flow (4-5 l/hr) at 550° C. during 1 hour that caused full reaction of NiO and $Co_3O_4$ oxides as well as palladium, platinum and rhodium compounds to the metals and accumulation of 5-10% of carbon.

3. Preparation of the slurry from the carbonized sample, pseudo-boehmite ($H_2O$ content 70% wt.) and tetraisopropoxysilane with water added while stirring till formation of liquid catalyst mass. The mass ratio of carbonized sample/$Al_2O_3$/$SiO_2$ was of 8/87/5.

4. Placement in catalyst mass of a foam nichrome cylinder (diameter 0.5 cm, height 1.2 cm, weight 0.5 g) that was precalcinated in air at 900° C. during 2 hours. Foam nichrome had open interconnected porosity (75%), specific surface of 250 $m^2$/g and density of 2.1 g/$cm^3$. After pore filling the cylinder was hold at 80° C. till the constant weight and calcinated at 1300° C. during 3 hours in an argon atmosphere and then treated by water vapours at 600° C. during 3 hours that leads to formation of transport channels due to fill elimination of carbon.

The particle sizes in catalyst mass were determined from data obtained via X-ray phase analysis performed on the Dron-3M diffractometer (CuKa radiation, nickel filter) at a scanning rate of 1 deg/min within 2θ angle range of 5-50° by Rietveld analysis performed with the help of RIETAN 2000 software [F. Izumi, T. Ikeda, Mater. Sci. Forum, 2000, 198, 321].

It is determined that Ni and Co oxide particle sizes obtained by nitrate decomposition are more than 150 nm while the same parameters for promoted NiCo-system are not more than 30 nm. These differences in sizes also occur for samples reduced by methane. For NiCo-system preparation there were used Ni and Co oxides with particle sizes of more than >150 nm, so the facts evidence significant dispersing of original particles. This is a necessary condition for achieving reversibility of oxidation-reduction transitions in the course of a catalytic reaction.

A distinguishing feature of the suggested method is the fact that for catalyst preparation there are used metal oxide systems which are treated by methane under conditions providing formation of metals and accumulation of a determined quantity of carbon. When calcinating foam nichrome with a layer of catalyst mass there was formed a hard coating, which, according to X-ray phase analysis data, consists of $\alpha$-$Al_2O_3$ mixture with mullite with nanosized nickel and cobalt particles incorporated in it.

Calcination of a sample in an argon flow excludes carbon oxidation and formation of inert spinets from Ni and Co oxides and $Al_2O_3$. Following carbon elimination with steam leads to transport channels formation with total volume of almost 4% of the carrier volume. It can be judged by concentration and density (approximately 1 g/$cm^3$) of carbon tubes and density of $\alpha$-$Al_2O_3$ (approximately 4 g/$cm^3$). Total specific surface of catalyst mass is within the range of 15-25 $m^2$/g that was determined by the low-temperature nitrogen adsorption method. Probably, the interstices among corundum particles partially contribute to this value.

The given invention is confirmed by the following examples.

EXAMPLE 1

According to aforementioned techniques, varying the component concentration ratio and nature of a platinum metal there was a series of systems prepared on the base of foam nichrome with 5-10% wt. of a catalyst coating which compositions are summarized in Table 3.

TABLE 3

Composition of a catalyst layer deposited on foam nichrome.

| No | Pd | Pt | Rh | NiO | $Co_3O_4$ | $Al_2O_3$ | $CeO_2$ | $ZrO_2$ |
|---|---|---|---|---|---|---|---|---|
| 1  | —   | —    | —    | 40    | 40   | 10   | 5   | 5   |
| 2  | 0.5 | —    | —    | 25.5  | 55.0 | 10.0 | 5.0 | 4.0 |
| 3  | 1.0 | —    | —    | 35.0  | 45.0 | 5.0  | 8.0 | 6.0 |
| 4  | 2.0 | —    | —    | 53.0  | 25.0 | 15   | 5   | —   |
| 5  | —   | 0.25 | —    | 60.75 | 20.0 | 4.0  | 7.0 | 8.0 |
| 6  | —   | 1.0  | —    | 46.0  | 35.0 | —    | —   | 18  |
| 7  | —   | 1.5  | —    | 15.0  | 63.0 | 12.5 | 5.0 | 3.0 |
| 8  | —   | —    | 0.25 | 40.75 | 35.0 | 15.0 | 5.0 | 4.0 |
| 9  | —   | —    | 1.0  | 25.0  | 55.0 | 10.0 | 5.0 | 4.0 |
| 10 | —   | —    | 1.5  | 60.5  | 15.0 | 14.0 | 7.0 | 2.0 |

Thus, the composition of catalyst coating on foam nichrome can be expressed by the following generalized formula: (0-2%)Pd-(0-1.5%)Pt-(0-1.5%)Rh-(15-60%)NiO-(15-60%)$Co_3O_4$-(0-15%)$Al_2O_3$-(0-8%)$CeO_2$-(0-18%)$ZrO_2$.

EXAMPLE 2

To demonstrate the necessity of transition metal oxide reduction and their carbonization in a methane flow there was prepared catalyst No. 11 with the following composition (% wt.): 1.5 Rh 60.5 NiO-15.0 $Co_3O_4$-14.0 $Al_2O_3$-7.0 $CeO_2$-2.0 $ZrO_2$. This system was not subjected to reduction and carbonization in a methane flow. A sample of such composition obtained without deposition on foam nichrome appeared to be vitreous mass with specific surface less than 1 $m^3$/g.

EXAMPLE 3

Testing of catalysts in the process of oxidative methane conversion by air oxygen with different concentrations of water vapors in the reaction mixture.

In Table 4 there are represented the methane oxidation conversion results. Experiments were carried out with external heating to 800-810° C. though, taking into account exothermicity of the process, it is possible that temperature in the reaction zone was much higher. $CH_4$/$O_2$ ratio was of 0.5. This is necessary for obtaining synthesis gas with optimal composition ($H_2$/CO=2) that was observed in the experiments held. The presence in the reaction mixture of small quantities of water vapors (2.3% vol.) did not noticeably influence the composition of synthesis gas formed.

Catalyst No. 1 that is free from platinoids had somewhat lower activity than that of the systems with noble metals. Some scatter in results may also be explained by different ratio of promoting additives. It should be noted that the catalysts after the experiment conserve their mass that points out to a catalyst coating high strength.

TABLE 4

Methane oxidative conversion (20th hour data).
T = 800-810° C.*; $V_{methane}$ = 1 l/hour; $V_{air}$ = 2.5 l/hour;
$H_2O$ vapor content = 2.3% vol.; τ = 0.25 sec.

| Catalyst | Conversion, % | | Selectivity, % | | $H_2$/CO, |
|---|---|---|---|---|---|
| No. | Methane | $O_2$ | $H_2$ | CO | mole |
| 1 | 85 | 88 | 91 | 89 | 2.05 |
| 2 | 95 | 97 | 92 | 93 | 1.98 |
| 3 | 96 | 99 | 93 | 92 | 2.02 |

TABLE 4-continued

Methane oxidative conversion (20$^{th}$ hour data).
T = 800-810° C.*; V$_{methane}$ = 1 l/hour; V$_{air}$ = 2.5 l/hour;
H$_2$O vapor content = 2.3% vol.; τ = 0.25 sec.

| Catalyst No. | Conversion, % | | Selectivity, % | | H$_2$/CO, mole |
|---|---|---|---|---|---|
| | Methane | O$_2$ | H$_2$ | CO | |
| 4 | 93 | 96 | 96 | 95 | 2.02 |
| 5 | 93 | 98 | 90 | 87 | 2.07 |
| 6 | 94 | 100 | 91 | 92 | 1.98 |
| 7 | 91 | 97 | 93 | 91 | 2.04 |
| 8 | 93 | 99 | 91 | 89 | 2.04 |
| 9 | 92 | 99 | 93 | 90 | 2.07 |
| 10 | 96 | 97 | 93 | 92 | 2.02 |
| 11** | 6 | 7 | 53 | 42 | 1.31 |

*The temperature of an external heater.
**The system was not subjected to reduction and carbonization in a methane flow.

Conspicuous is the fact that there is a very low activity of sample No. 11 which had the same composition as catalyst No. 10 but was not subjected to reduction and carbonization in a methane flow. Thus this fact evidences the necessity of transition metal oxide reduction and their carbonization that provides formation of a porous structure active phase.

TABLE 5

Methane oxidative conversion (20$^{th}$ hour data).
T = 800-810° C.; V$_{methane}$ = 1 l/hour; V$_{air}$ = 2.5 l/hour;
H$_2$O vapor content = 7.3% vol.; τ = 0.25 sec.

| Catalyst No. | Conversion, % | | Selectivity, % | | H$_2$/CO, mole |
|---|---|---|---|---|---|
| | Methane | O$_2$ | H$_2$ | CO | |
| 1 | 89 | 85 | 95 | 82 | 2.32 |
| 2 | 97 | 94 | 94 | 89 | 2.11 |
| 3 | 96 | 95 | 95 | 87 | 2.02 |
| 4 | 95 | 96 | 96 | 89 | 2.18 |
| 5 | 97 | 94 | 94 | 86 | 2.19 |
| 6 | 96 | 98 | 93 | 88 | 2.11 |
| 7 | 94 | 95 | 95 | 85 | 2.24 |
| 8 | 95 | 94 | 94 | 84 | 2.24 |
| 9 | 97 | 96 | 95 | 87 | 2.18 |
| 10 | 96 | 97 | 97 | 89 | 2.18 |

H$_2$O vapor content increase in methane+air mixture from 2.3 to 7.3% vol. exerts a certain influence on methane oxidative conversion product composition (Table 5). Oxygen conversion and carbon monoxide formation selectivity is to some extent decreased. At the same time, methane conversion and hydrogen selectivity is somewhat increased. Obviously, it is connected with occurring reactions with H$_2$O:

$$CH_4 + H_2O \rightarrow CO + 3H_2$$

$$CO + H_2O \rightarrow H_2 + CO_2.$$

EXAMPLE 4

Oxidative-Steam Conversion of Methane+Ethane Mixture

Data on oxidation conversion of methane+ethane mixture (volume ratio 2/1) using air oxygen are summarized in Table 6.

This process can be expressed as follows:

$$2CH_4 + C_2H_6 + 2O_2 + 8N_2 \rightarrow 4CO + 7H_2 + 8N_2 \text{ (H}_2/CO = 1.75 \text{ mole)}.$$

In all cases hydrogen conversion was of 94-97%. The ethane conversion degree was close to 100% while the methane conversion degree was somewhat lower that seems to be connected with different reactivity of these hydrocarbons. The volume of hydrogen and carbon monoxide formed is determined according to the following equations:

$$V(H_2) = 2S(H_2) \cdot [4K(CH_4) + 3K(C_2H_6)]$$

$$V(CO) = S(CO) \cdot [2K(CH_4) + 2K(C_2H_6)].$$

TABLE 6

Methane + ethane mixture oxidative conversion (20$^{th}$ hour data).
T = 800-810° C.; V$_{mixture}$ = 1 l/hour; V$_{air}$ = 3.3 l/hour;
H$_2$O vapor content = 2.3% vol.; τ = 0.31 sec.

| Catalyst No. | Conversion, % | | Selectivity, % | | H$_2$/CO, mole |
|---|---|---|---|---|---|
| | Methane | Ethane | H$_2$ | CO | |
| 1 | 83 | 98 | 91 | 89 | 1.69 |
| 2 | 92 | 99 | 92 | 93 | 1.72 |
| 3 | 95 | 99 | 94 | 92 | 1.74 |
| 4 | 94 | 100 | 95 | 96 | 1.76 |
| 5 | 91 | 98 | 93 | 94 | 1.73 |
| 6 | 92 | 100 | 94 | 91 | 1.70 |
| 7 | 92 | 99 | 96 | 92 | 1.72 |
| 8 | 93 | 99 | 92 | 93 | 1.73 |
| 9 | 92 | 98 | 93 | 91 | 1.71 |
| 10 | 94 | 99 | 95 | 92 | 1.72 |

H$_2$/CO ratio observed in the conditions chosen was within the range of 1.69-1.76 that corresponds to oxidative conversion of methane+ethane mixture of a given composition.

A following series of experiments was carried out with methane+ethane+air mixture, which contained 9% vol. H$_2$O vapors (Table 7).

TABLE 7

Methane + ethane mixture oxidative conversion (20$^{th}$ hour data).
T = 800-810° C.; V$_{mixture}$ = 1 l/hour; V$_{air}$ = 2.5 l/hour;
H$_2$O vapor content = 9% vol.; τ = 0.25 sec.

| Catalyst No. | Conversion, % | | Selectivity, % | | H$_2$/CO, mole |
|---|---|---|---|---|---|
| | Methane | Ethane | H$_2$ | CO | |
| 1 | 84 | 98 | 83 | 86 | 1.93 |
| 2 | 92 | 97 | 91 | 93 | 1.96 |
| 3 | 95 | 99 | 92 | 95 | 1.94 |
| 4 | 91 | 96 | 93 | 95 | 1.96 |
| 5 | 93 | 98 | 90 | 93 | 1.94 |
| 6 | 95 | 100 | 89 | 92 | 1.94 |
| 7 | 94 | 97 | 92 | 95 | 1.94 |
| 8 | 95 | 99 | 89 | 93 | 1.91 |
| 9 | 92 | 99 | 91 | 95 | 1.96 |
| 10 | 96 | 97 | 90 | 94 | 1.91 |

The obtained data evidence that on the investigated catalysts there occurs not only hydrocarbon oxidative conversion but alkane interaction with H$_2$O. Introducing water vapors into reaction mixture in amount of 9% vol. allows to increase the mole H$_2$/CO ratio almost to 2.

The data mentioned above evidence that the developed catalysts on the base of foam nichrome are as efficient in steam-oxidation conversion of methane and methane+ethane mixture into synthesis gas as the systems claimed in the prototype. This method is applicable for a wide range of catalytic systems as far as it allows to create a desired porous structure in different single and mixed oxides as well as prevent possible formation of stable compounds between active components and a carrier.

The invention claimed is:

1. The method for preparation of oxide-polymetallic catalysts containing platinum-group metals for steam-oxidative conversion of hydrocarbons to obtain carbon monoxide and hydrogen characterizes in that it includes treatment of NiO and $Co_3O_4$ by solutions of Al, Ce, Zr nitrates and palladium ($Pd(NH_3)_4Cl_2$), platinum ($H_2[PtCl_6] \cdot 6H_2O$) and rhodium ($H_3[RhCl_6]$) compounds followed by drying, carbonization of the obtained material in a methane flow at 550° C., preparation of slurry from this material, pseudo-boehmite and tetraisopropoxysilane, filling foam nichrome pores with obtained material suspension, elimination of water at 80° C., calcinating during 3 hours in an atmosphere of argon at 1300° C., elimination of carbon by water vapors at 600° C. during 3 hours.

2. A method of claim 1 characterized in that NiO and $Co_3O_4$ treatment is carried out by a solution with total concentration of 5-20%.

3. A method of claim 1 characterizes in that carbonization is carried out till the full reduction of NiO and $Co_3O_4$ oxides and palladium, platinum and rhodium compounds to the metals and accumulation of 5-10% of carbon.

4. A method of claim 1 characterized in that foam nichrome is precalcinated in air at 900° C. during 2 hours.

\* \* \* \* \*